United States Patent
Kuang

(10) Patent No.: US 10,212,277 B2
(45) Date of Patent: Feb. 19, 2019

(54) SYSTEM AND METHOD FOR DETECTING PHONE FRAUDS OR SCAMS

(71) Applicant: Shaobo Kuang, Lansdale, PA (US)

(72) Inventor: Shaobo Kuang, Lansdale, PA (US)

( * ) Notice: Subject to any disclaimer, the term of this patent is extended or adjusted under 35 U.S.C. 154(b) by 0 days.

(21) Appl. No.: 15/650,919

(22) Filed: Jul. 16, 2017

(65) Prior Publication Data
US 2019/0020759 A1    Jan. 17, 2019

(51) Int. Cl.
*H04M 3/436*   (2006.01)
*H04M 1/663*   (2006.01)
*H04W 12/12*   (2009.01)
*G06N 99/00*   (2010.01)
*H04M 7/00*    (2006.01)
*H04W 12/00*   (2009.01)
*H04W 4/18*    (2009.01)

(52) U.S. Cl.
CPC .......... *H04M 3/436* (2013.01); *G06N 99/005* (2013.01); *H04M 1/663* (2013.01); *H04M 7/0078* (2013.01); *H04W 4/18* (2013.01); *H04W 12/00* (2013.01); *H04W 12/12* (2013.01); *H04M 2203/6027* (2013.01)

(58) Field of Classification Search
CPC ....... H04W 12/12; H04W 4/16; H04W 12/00; H04W 12/08; H04W 12/10; H04M 3/2281; H04M 15/47; H04M 15/8083; H04M 1/66; H04M 1/80; H04M 1/663; H04M 3/436; H04M 1/575; H04M 7/0078; H04M 7/0081; G06N 99/00; H04Q 2213/13139; H04Q 2213/13256; H04Q 2213/13274; H04Q 2213/13284

USPC ........................................................ 455/410
See application file for complete search history.

(56) References Cited

U.S. PATENT DOCUMENTS

| | | | | |
|---|---|---|---|---|
| 5,392,335 A * | 2/1995 | Reeder | ............ | H04M 3/38 379/189 |
| 5,444,774 A * | 8/1995 | Friedes | ............ | H04M 3/523 379/266.01 |
| 6,442,265 B1 * | 8/2002 | Harlow | ............ | H04M 3/36 379/189 |
| 7,295,660 B1 * | 11/2007 | Higginbotham | ...... | H04M 3/436 379/196 |
| 8,145,562 B2 * | 3/2012 | Wasserblat | ............ | G06Q 10/10 705/38 |
| 8,879,703 B1 * | 11/2014 | Lavian | ............ | H04M 3/493 379/201.01 |
| 9,203,962 B2 * | 12/2015 | Guerra | ............ | G06Q 50/01 |
| 9,596,347 B2 * | 3/2017 | Ronketti | ............ | H04M 3/4285 |
| 9,692,885 B2 * | 6/2017 | Bhupati | ............ | H04M 3/2281 |
| 9,883,040 B2 * | 1/2018 | Strong | ............ | G06N 99/005 |
| 2003/0072426 A1 * | 4/2003 | Davidson | ............ | H04M 3/436 379/142.01 |
| 2003/0103619 A1 * | 6/2003 | Brown | ............ | H04M 3/523 379/266.01 |
| 2004/0063424 A1 * | 4/2004 | Silberstein | ............ | H04M 3/2281 455/410 |

(Continued)

*Primary Examiner* — Meless N Zewdu

(57) ABSTRACT

A phone frauds or scams detecting system comprises a first detecting unit for obtaining callers' characteristics and a second detecting unit for interacting with callers and obtaining callers' additional characteristics. The system determines frauds or scams based on the callers' characteristics and the callers' additional characteristics and plays commercial advertisements to the callers if one or many frauds or scams determined.

15 Claims, 7 Drawing Sheets

(56) References Cited

U.S. PATENT DOCUMENTS

| | | | | |
|---|---|---|---|---|
| 2007/0288951 A1* | 12/2007 | Ray | ............... | G06Q 30/02 |
| | | | | 725/23 |
| 2008/0084975 A1* | 4/2008 | Schwartz | ............. | H04M 3/436 |
| | | | | 379/88.22 |
| 2009/0041209 A1* | 2/2009 | Agapi | ............... | H04M 3/4285 |
| | | | | 379/87 |
| 2010/0169156 A1* | 7/2010 | Gustafson | ............ | G06Q 30/016 |
| | | | | 705/14.1 |
| 2010/0191602 A1* | 7/2010 | Mikkelsen | ........... | G06Q 20/322 |
| | | | | 705/14.64 |
| 2013/0054379 A1* | 2/2013 | Seo | ............... | G06Q 30/02 |
| | | | | 705/14.69 |
| 2013/0253919 A1* | 9/2013 | Gutierrez | ............. | G06Q 20/24 |
| | | | | 704/201 |
| 2014/0177479 A1* | 6/2014 | Cook | ............... | H04M 1/663 |
| | | | | 370/259 |
| 2016/0150414 A1* | 5/2016 | Flaks | ............... | H04W 12/12 |
| | | | | 455/406 |
| 2017/0133017 A1* | 5/2017 | Rajakumar | ............ | G10L 17/06 |
| 2018/0013881 A1* | 1/2018 | Cooper | .............. | H04M 3/2281 |

* cited by examiner

400A 400 start

SYSTEM AND METHOD FOR DETECTING PHONE FRAUDS OR SCAMS

FIELD OF THE INVENTION

The present invention relates to telecommunication technology, more particularly a system and method for detecting phone frauds or scams.

BACKGROUND OF THE INVENTION

With the developing of wireless communication technology, mobile phones have become increasingly popular. However, as mobile phones have become more prevalent throughout the world, phone frauds or scams have become a major problem. Mobile phone frauds or scams steal hundreds of millions of dollars every year from carriers and mobile phone users. Like all crimes, there are many different kinds of frauds or scams.

For example, the telemarketing cold calls prospective clients and promises for a fee that they would collect their business debts. They just try to con the clients. Sometimes, the con was successful.

Currently, most fraud or scam detecting systems monitor inbound calls by their many features, such as suspect numbers, risk factors, and thresholds. A threshold normally is which, when exceeded, indicates possible fraud.

Suspect numbers are normally the caller's phone numbers which match the numbers in a called blacklist. If fraud is suspected, the fraud detecting systems will notify the users or receivers and suggest appropriate actions to stop the frauds or scams.

Fraudulent telemarketers also pose often as calling on behalf of charities. They then ask for the victims to make a donation to the charities over the phones. The criminal then takes the credit card information and makes unauthorized purchases with it.

Frequent victims of telemarketing scams include the poor, the elderly, and immigrants without strong English skills.

Criminals also frequently use pyramid schemes over the phone. A pyramid scheme requires the victim to pay an initial sum of money and is promised in return to receive sums of money from a number of different people that will exponentially increase the initial investment. While those that join the scheme in the beginning may profit, those at the bottom of the scheme who cannot find any followers will receive no such return.

Normal telemarketing, sometimes known as inside sales or telesales, is a method of direct marketing over phones. Sometimes, salespersons try to sell unnecessary, useless or overpriced products or services to their customers. Although these normal telemarketing sales are not frauds or scams, they really bother people a lot and cause many problems or issues.

Internet-powered phone systems have made it cheap and easy for scammers to make illegal sales robocalls from anywhere in the world. It also lets them hide from law enforcement by displaying fake caller ID information.

SUMMARY OF THE INVENTION

It is, therefore, the objects of the present invention are intended to overcome the drawbacks of the conventional art.

Accordingly, an object of the present invention is to provide a method and a system for detecting phone frauds.

Another object of the present invention is to provide a method and a system for detecting phone frauds or scams.

Another object of the present invention is to provide a method and a system of reducing phone frauds and scams.

Another object of the present invention is to provide a method and a system of reducing the number of unwanted sales calls.

Another object of this invention is to provide a method and a system of helping users to combat telemarketing frauds or scams.

Another object of the present invention is to provide a method and a system of helping those people, who are the poor, the elderly, and immigrants without strong English skills, to combat telemarketing frauds or scams.

Another object of present invention is to provide a method and a system of helping people to deal with those unwanted sales calls.

Another object of present invention is to provide a method and a system of helping people, who are the poor, the elderly, and immigrants without strong English skills, to deal with those unwanted sales calls.

Another object of the present invention is to provide a method and a system of detecting phone frauds or scams by allowing the system to interact with callers on behalf on receivers.

Another object of the present invention is to provide a method and a system of detecting phone frauds or scams by interacting with callers on behalf of receivers before the calls ring through to receivers.

Another object of the present invention is to provide a method and a system of detecting phone frauds or scams by using AI (Artificial intelligence) or ML (machine learning) technology to interact with callers on behalf of receivers before allowing the calls ring to the receivers' devices.

Another object of the present invention is to provide a method and system of detecting phone frauds or scams by playing commercial advertisements to callers who are trying to sell unwanted products through phones.

Another object of the present invention is to provide a method and system of detecting phone frauds or scams by playing commercial advertisements to callers who are phone scammers.

Another object of the present invention is to provide a method and system of detecting phone frauds or scams by playing commercial advertisements to callers and waste scammers' time.

Further objects and advantages of our invention will become apparent from a consideration of the drawings and ensuring descriptions.

A phone frauds or scams detecting system according to the present invention comprises:
  means for receiving a call from a caller to a receiver;
  a first detecting unit for obtaining one or many characteristics of the caller and determining phone frauds or scams for the call based on the characteristics;
  a second detecting unit for interacting with the caller, obtaining one or many additional characteristics of the caller, and determining phone frauds or scams for the call based on the additional characteristics.

The phone frauds or scams detecting system further comprises
  a third detecting unit for obtaining the fraud or scam possibility values of the call and determine phone frauds or scams for the call based on the possibilities values;
  a commercial unit for playing voice or video commercial advertisements to the caller when frauds or scams are determined for the call or when fraud or scam possibilities values of the call are higher than a predefined value.

A method of detecting or determining phone frauds or scams comprising:
receiving a call from a caller's device to a receiver's device;
collecting or obtaining one or many characteristics of the call or the caller;
interacting with the caller and obtaining one or many additional characteristics of the caller;
determining whether the call is a phone fraud or scam based on the characteristics and the additional characteristics of the caller, or the fraud or scam possibility for the call;
playing voice or video commercial advertisements to the caller if the call is a phone fraud or scam or if the call with a high fraud or scam possibility;
ringing the receiver's device if the call is not a phone fraud or scam.

The present invention is described in the detail below, together with its further objectives, features, and advantages, in conjunction with the following drawings:

DETAILED DESCRIPTION OF THE INVENTION

Reference will now be made in detail to the preferred embodiments of the present invention, a method and system of detecting phone frauds or scams, examples of which are illustrated in the accompanying drawings.

Figure 1:
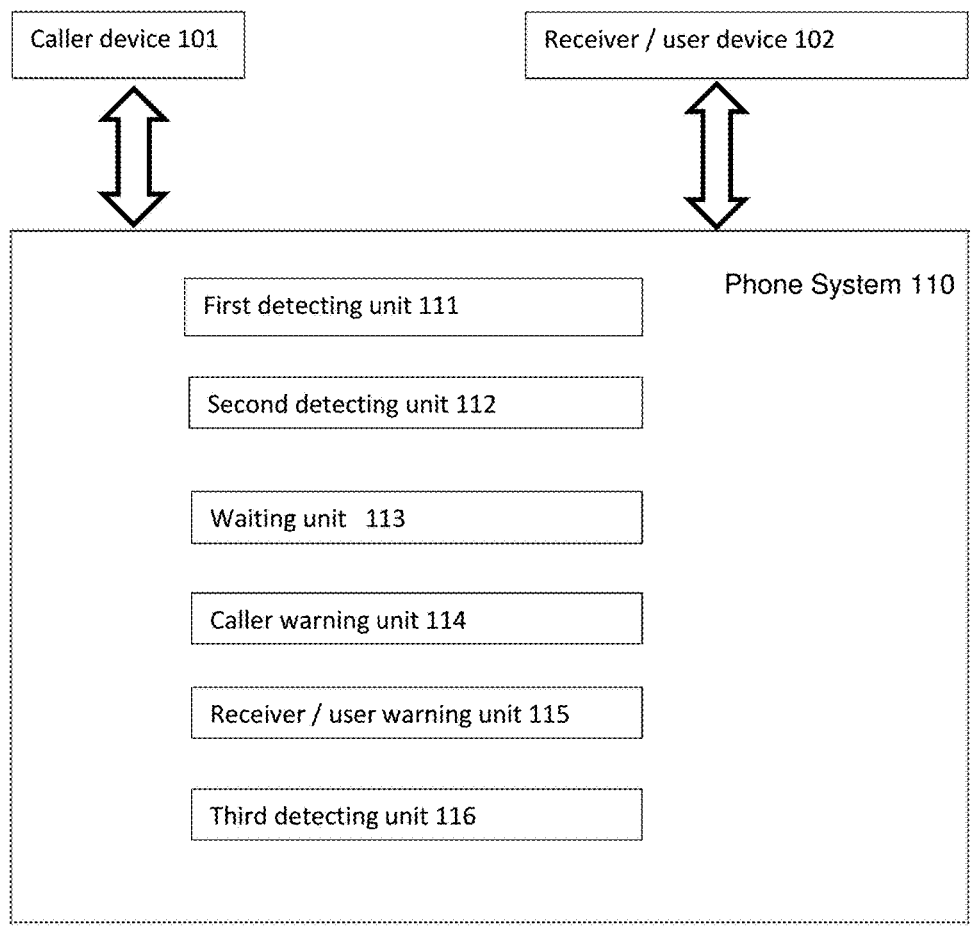
FIG. 1 is a schematic drawing showing an example of the phone system in accordance with the present invention.

Referring now to the drawings, FIG. 1 shows a phone system of detecting phone frauds or phone scams in accordance with the present invention. In this example, 101 is a caller's communication device and 102 is a receiver or user's communication device, which are normally mobile phones, regular phones, PCs or iPads. Phone system 110 includes a first detecting unit 111 for determining whether or not a phone call, which is from a caller to a receiver, and corresponds to one or many characteristics or characters, such as the caller's phone number, IP address, ID, name, location, gender, age, occupation and other information, is a phone fraud or scam. The first detecting unit 111 compares the caller's characteristics or characters with the characteristics or characters in one or many stored blacklists of known characteristics or characters that are associated with fraud or scam agents. The first detecting unit 111 also compares the caller's characteristics or characters with the characteristics or characters in one or many stored whitelists of known good characteristics that are trusted by the public or receivers and are not associated with any fraud or scam agents. If the caller's characteristics match the characteristics in the blacklists, the first detecting unit 111 will provide a notification to the receiver through the receiver warning unit 115, or will not allow the call to ring the receiver's phone and simply terminates the call. If the caller's characteristics match the characteristics in the whitelists, the detecting unit 111 will allow the call to ring the receiver's device. The blacklists may include the receiver's blocked list. The whitelists may include the receiver's contacts from his or her phonebook or from his or her social networking or social media, such as FACEBOOK. The blacklists may include the receiver's blocked numbers or names. The blacklists and whitelists are stored in the first detecting unit 111, or are stored in the phone system 110, or are stored in carriers' database, or even a third party cloud database, such as FBI frauds or scams database. The phone system 110 further includes a second detecting unit 112 for determining phone frauds or scams and for determining phone fraud or scam types by interacting with the caller on behalf on the receiver. For example, the second detecting unit 112 prompts for the caller a voice menu options based on predefined anti-fraud or anti-scam for the caller's selection, to obtain or collect one or many additional caller's characteristics from the caller's selections from the menu options. Examples of voice menu options are "Salesperson press 1, Home Service press 2". If the caller presses 1, the second detecting unit 112 will have "Salespeople" as an additional characteristic of the caller. The caller's additional characteristics are normally callers' names, gender, caller's accents, the purpose of the calls, types of callers' business, and the organizations represented by callers. The second detecting unit 112 compares the caller's additional characteristics with the characteristics in blacklists and whitelists or compares the combination of the additional characteristics with the combination of the characteristics in blacklists and whitelists to determine whether the call is a phone fraud or scam. If the caller's additional characteristics match the characteristics in the blacklists, the second detecting unit 112 will provide a notification to the receiver through the receiver warning unit 115 and suggest appropriate actions to stop the frauds or scams to the receiver, or will not allow the call to ring the receiver's device and simply terminates the call. If the caller's additional characteristics match the characteristics in the whitelists, the second detecting unit 112 will allow the call to ring the receiver's device. The phone system 110 further includes a third detecting unit 116. The third detecting unit 116 further compares the caller's additional characteristics with the characteristics in one or many possible fraud or scam lists to determine the possibilities of phone frauds or scams for the call. The possible fraud or scam lists are the lists of known characteristics that suggest or have possibilities of frauds or scams based on statistics or other rules or information. The possible fraud or scam lists are stored in the third detecting unit 116, or are stored in the phone system 110, or are stored in carriers' database, or even a third party cloud database, such as GOOGLE frauds or scams database. Based on the values of the possibilities of frauds or scams, the second detecting unit 112 will play voice commercial advertisements to the caller, or pass the call to the waiting unit 113, or allow the call to ring the receivers' device, or reject the call. The third detecting unit 116 determines the types of the advertisements and the period of playing the advertisements. The types of commercial advertisements depend on or are determined by the value of the possibilities of frauds or scams or the types of frauds or scams or the caller's characteristics and the value of other factors. The period of playing commercial advertisements depends on or is determined by the value of the possibilities of frauds or scams or the types of frauds or scams and the caller's characteristics and the value of other factors. For example, a caller with a higher possibility of frauds or scams will have a long voice or video commercial advertisements while a caller with a lower possibility of frauds or scams will have a short voice or video commercial advertisements. If the values of the possibilities of frauds or scams are higher than or exceed preselected threshold values, the second detecting unit 112 will pass the call to the waiting unit 113, or reject the call, or just simply play voice or video commercial advertisements to the caller who is a possible fraudster or scammer. Playing commercial advertisements to scammers will waste scammers' time and will reduce frauds or scams. If the values of the possibilities of frauds or scams are lower than preselected threshold values, the second detecting unit 112 will allow the call to ring through the receiver. The waiting unit 113 puts the caller on-hold and plays or leaves the caller a voice message like "the person you are calling is currently busy, please stay on the line and your call will be answered shortly", and put the caller on hold for a certain period. The caller's wait or hold time can be determined by the values of possibilities of frauds or scams. The caller's wait or hold time can also be determined by types of the detected possible frauds or scams. The wait or hold time can also be determined by the caller's characteristics. For example, the waiting unit 113 puts the caller on hold for a longer period for a higher possibility of frauds or scams. During the caller's wait or hold time, the waiting unit 113 can play voices commercial advertisements to the caller. During the caller's wait or hold time, the caller's warning unit 114 plays a warning message to the caller based on the caller's characteristics and other caller's information. For example, the second detecting unit 112 determines that the caller is trying to sell lottery tickets to the receiver/user. The caller warning unit 114 will play a voice message like "According to the State Law, selling lottery tickets through phones is illegal". The second detecting unit 112 notifies the receiver/user through the receiver/user warning unit 115 if the call has been determined as a fraud or scam. In the examples above, both the first detecting unit 111 and the second detecting unit 112 perform fraud or scam detections before the call starts to ring the receivers' device. The fraud or scam detections by the second detecting unit 112 can also be done after the call being passed to the receiver, or during the call conversation between the caller and receiver/user. In this case, the receiver device 102 further includes a trigger unit to allow receivers to pass the call to or initiate the second detecting unit 112 for detecting frauds or scams by an action like touching on device screens, pressing a button, shaking the receiver devices, speaking out commands, or even a special posture by the receivers/users.

Figure 2:
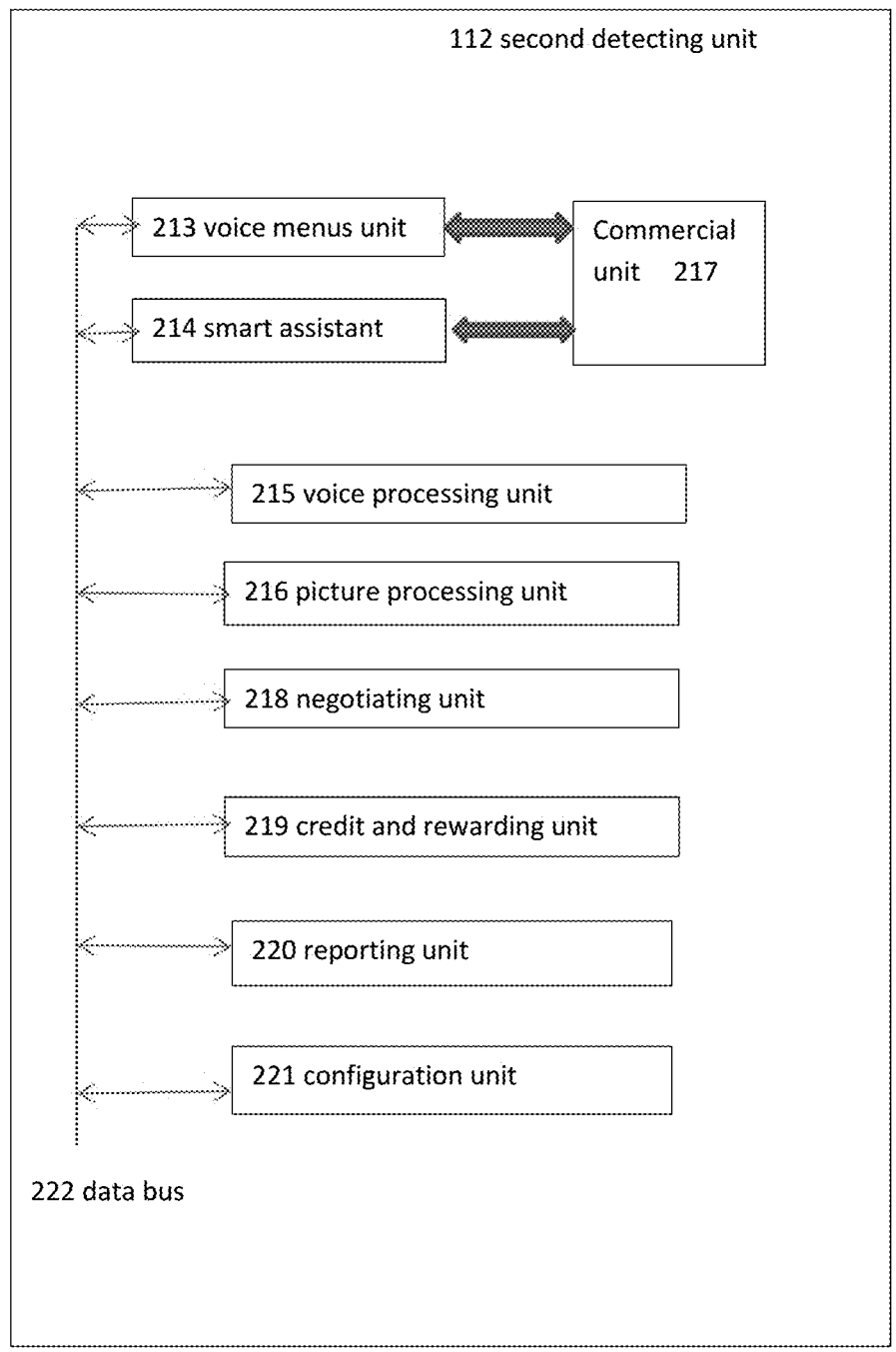
FIG. 2 is a schematic drawing showing an example of the second detecting unit in according with the present invention.

FIG. 2 shows the second detecting unit 112 in detail according to the present invention. The second detecting unit 112 includes a smart voice menus unit 213, which, based on the detected caller's characteristics, dynamically provides voice menus to interact with callers to obtain one or many additional characteristics of the caller and to determine the possibilities of phone frauds or scams. In the voice menus, callers simply navigate through the menu with the keypad or touch buttons of their phones or with simple voice instructions. For example, voice menus are "Press one for International calls, Press two for domestic calls," or "Please say YES for international calls", and so on. If one of the caller's characteristics detected by the first detecting unit 111 is a foreign call, and the caller presses two to pretend to be calling from the States, the second detecting unit 112 will determine the call with a higher possibility of phone frauds or scams. Sometimes, after a caller makes a choice, the system might present the caller with secondary voice menus to further determining the possibilities of phone frauds or scams. The second detecting unit 112 further includes a smart/intelligent assistant (virtual assistant or machine assistant) unit 214, which is capable of interacting with callers on behalf of receivers through a smart interactive voice response (IVR) system or other intelligent systems. The smart assistant unit 214 uses big data, AI (Artificial Intelligence) or other technology to ask callers many questions to further obtain or collect the caller's additional characteristics and determine frauds/scams or the possibilities of frauds/scams. The smart assistant unit 214 uses predefined or stored anti-fraud or anti-scam strategies to ask caller's questions to obtain or collect callers additional characteristics based on caller's answering the questions. The smart assistant unit 214 also uses predefined anti-fraud or anti-scam strategies to fight against frauds or scams. For example, a caller tells the smart assistant he is now in New York, and the smart assistant 214 may ask "how is weather there". A fraud will be determined If the caller's answers "good" and, actually, at this time, it is raining in New York City. For example, if scammers ask for bank accounts, the smart assistant unit 214, based on a predefined anti-fraud or anti-scam strategy for fighting against stealing bank accounts, tells the scammers a wrong or useless account number, or forwards the call to a professional anti-scam center, such as FBI or police offices. The smart assistant unit 214 further includes a negotiating or bargaining system, which negotiates with the caller, who is a normal telemarketer, and gets a better deal for the receiver by using big data, AI (Artificial Intelligence), or other technologies. For example, when a salesperson from a window replacement company calls in, the smart assistant unit 214, based on the fact that the receiver has called or searched on the web to look for window replacement companies, initiates the negotiating/bargaining system to negotiate with the caller to get a better deal for the receiver. In the above example, the second detecting unit 112 performs detecting of phone frauds or scams before allowing the call to ring receivers' devices. In other words, the second detecting unit 112 interacts with callers before receivers pick up inbound phone calls. The second detecting unit 112 can also perform detection of phone frauds or scams during the conversation between callers and receivers. In this case, there is a trigger, such as a touch button on iPad screen or voice command sensor, in receiver's devices for allowing receivers to trig or initiate performing of detecting phone frauds or scams by the second detecting unit 112. The second detecting unit 112 further includes a commercial unit 217, which, based on the detected caller's characteristics and the detected caller's additional characteristics or the types of the detected frauds or scams, prompts the caller commercial menu options or interacts with the caller to sell products to the caller or to ask the caller some commercial questions. The commercial unit 217 works with the smart menu unit 213 or the smart assistant 214. For example, if a caller is a basketball 76er's fan, the commercial unit 217 then will pick an NBA ticket sales commercial, and, through the smart voice menus unit 213, prompt for the caller a menu option to buying 76er's game tickets, or through the smart assistant 214 to talk to the caller and sell the 76er's tickets to him or her. The commercial unit 217 can also put the caller on hold and play voice or video commercial advertisement to him or her. In the smart voice menus unit 213 and smart assistant 214, there is a configuration or setting unit 221 for allowing users to set an unwanted or not interested list for inbound regular sales or promotional calls, or to set a wanted or interested list for inbound regular sales or promotional calls. The configuration or setting unit 221 allows users/receivers to associate callers' characteristics and callers' additional characteristics to one or many types of commercial advertisements or to one or many advertisements for playing commercial advertisements based on callers' characteristics and callers' additional characteristics or based types of frauds or scams. If a call relates the sales or the promotions in the unwanted or not interested list, it will reject the call or pass the call to the commercial unit 217. However, if a call relates the sales in the wanted or interested list, then, it will pass the call to the receiver or pass the call to the negotiating unit 218, which will negotiate or bargain prices with the caller. The negotiating unit 218 will use big data, AI or other technologies to compare the products, prices, qualities, product's features and other things, to negotiate or bargain a better deal for the receiver. The second detecting unit 112 further includes a credit or reward unit 219 for crediting or rewarding receivers for playing voice or video commercial advertisements to callers. The second detecting unit 112 further includes a reporting unit 220 for showing users/receivers a report of listing the detected frauds or scams summary and their total credits or rewards of playing voice or video commercial advertisements to callers. The second detecting unit 112 further includes a voice-processing unit 215 for processing callers' voices to determine frauds or scams, or the possibilities or possibility values of frauds or scams. The voice processing unit 215 compares the caller's voiceprint with the voiceprints in a stored database of phone frauds or scams to determine phone frauds or scams, or to determine the possibilities or possibility values of phone frauds or scams. The voice-processing unit 215 obtains the voice accents of callers, determines the locations or the nations of callers and determines frauds/scams or the possibilities or possibility values of frauds/scams. If a foreign accent of the caller is detected, commercial unit 217 will play voice or video commercial advertisements for accent reduction training programs, courses or other products. In the second detecting unit, there are many stored fraud or scam cases or samples for detecting or fighting frauds or scams. For example, If a foreign accent of the caller is detected, and the caller tells that he is calling from IRS for tax collecting, the second detecting unit 112 will determine a fraud or scam based on the stored fraud or scam samples or cases. The second detecting unit 112 further includes a picture or image processing unit 216 for processing callers' picture or image to comparing the caller's pictures or images with one or many picture or image databases which store many frauds, scammers or criminals pictures, and to determine frauds/scams or the possibilities of frauds/scams. In this example, the first detecting unit 111 and the second detecting unit 112 are in one or many cloud servers. The first detecting unit 111 or/and the second detecting unit 112 can be in the receiver device 102.

Figure 3A:
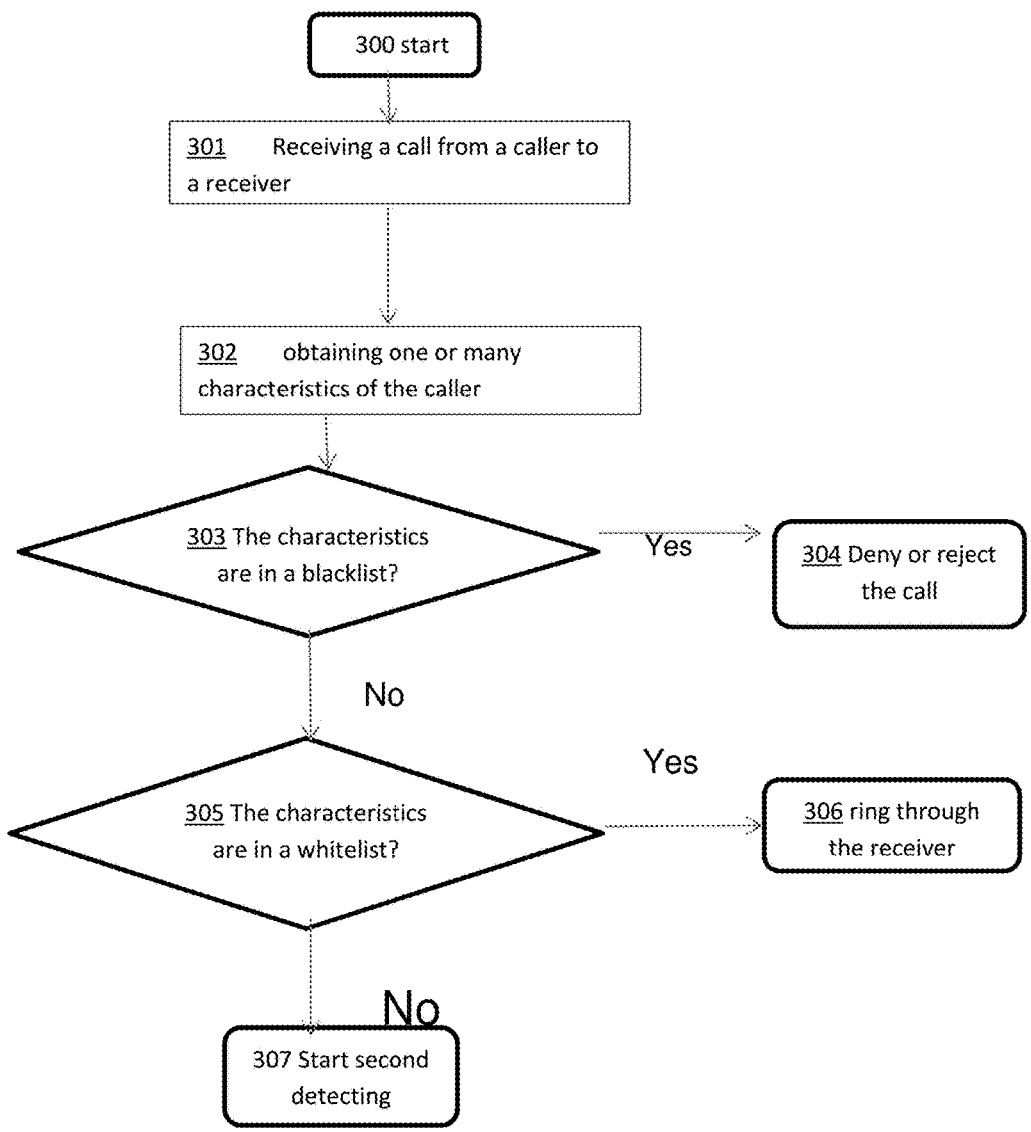
FIG. 3A is a flow diagram illustrating a method of detecting phone frauds or scams in accordance with the first embodiment of the present invention.
Figure 3B:
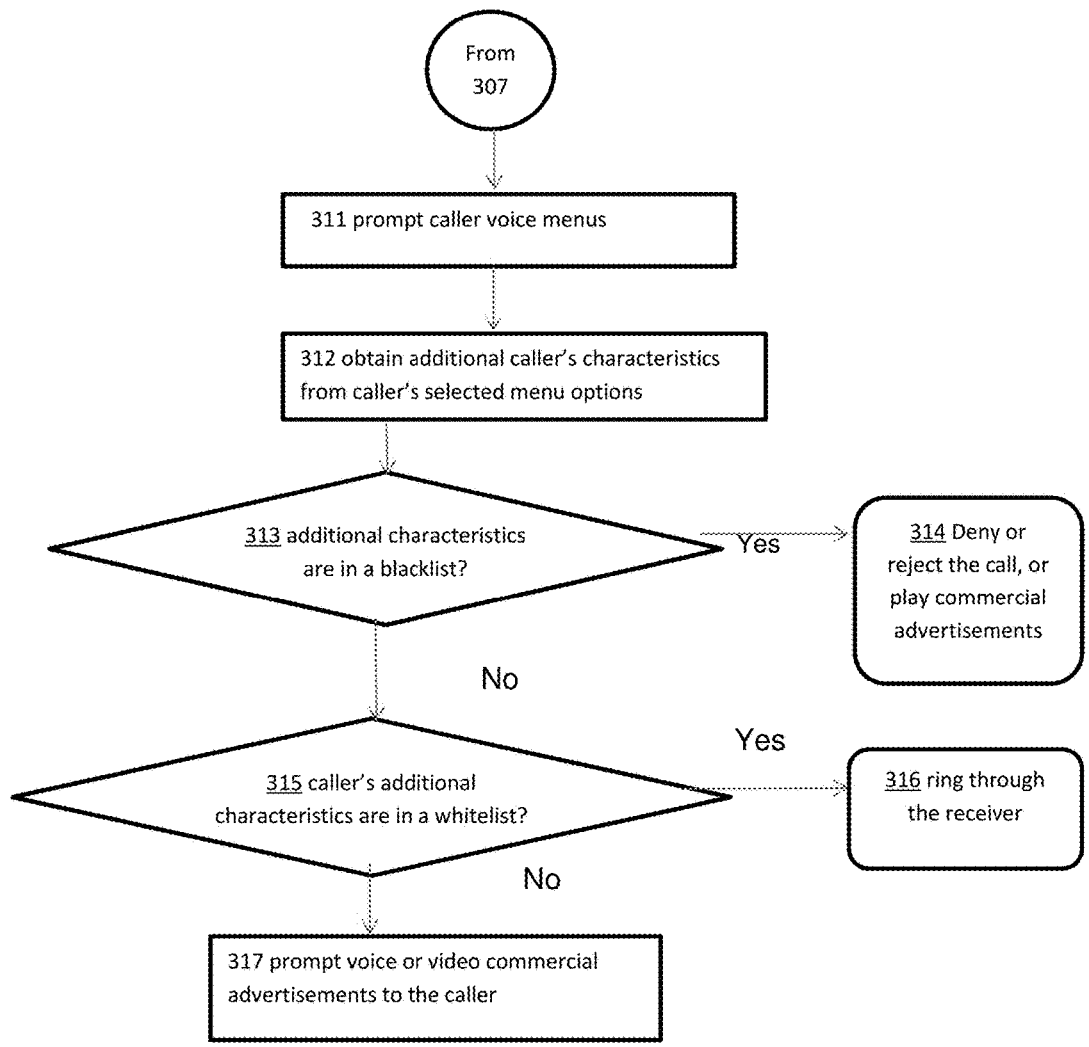
FIG. 3B a is flow diagram illustrating a method of detecting phone frauds or scams in accordance with the second embodiment of the present invention.

FIG. 3A and FIG. 3B illustrates a method of detecting phone frauds or scams. The method of flow diagram 300A is capable of detecting phone frauds or scams. At 301, the present embodiment receives a call from a caller's device to a receiver's device, where the caller's device and the receiver's device are mobile phones, regular phones, PCs, or IPads. At 302, the present embodiment obtains or collect the callers' information, which includes one or many caller's characteristics, such as the caller's phone number, IP address, ID, name, location, gender, age, occupation, the caller's contact lists and other data. At 303, the present embodiment determines if the caller's characteristics match with the characteristics in one or many blacklists of known characteristics that are associated with frauds or scams. If one or many the caller's characteristics match the characteristics in the blacklists, then the present embodiment proceeds to 304 to deny or reject the call, otherwise, the present embodiment proceeds to 305. At 305, the present embodiment determines if the caller's characteristics match with the characteristics in one or many whitelists of known characteristics that are not associated with any frauds or scams, and are trusted by the public and by the receiver. If one or many the caller's characteristics match with the characteristics in the whitelists, then the present embodiment proceeds to 306 to allow the call to ring the receivers' device or to pass the call to the receiver, otherwise, the present embodiment proceeds to 307, which proceeds to 311 to further detecting of frauds or scams.

At 311 the present embodiment of the invention prompts for the caller voice menu options. At 312 the embodiment obtains or collects additional caller's characteristics from the caller's selections of the menu options. At 313, the present embodiment of the invention compares the caller's additional characteristics with the characteristics in one of many blacklists. If one or many caller's additional characteristics match the characteristics in the blacklists, then the embodiment of the present invention proceeds to 314 to deny or reject the call, or play voice or video advertisements to the caller based on the caller's characteristics and the caller's additional characteristics. If the caller's additional characteristics do not match the characteristics in the blacklists, the embodiment of the present invention proceeds to 315. At 315, the embodiment of the present invention compares the caller's additional characteristics with the characteristics of one or many whitelists. If the callers' additional characteristics match the characteristics of the whitelists, the embodiment of the present invention proceeds to 316 to allow the call to ring the receiver's phone. If the callers' additional characteristics do not match the characteristics in the whitelists, the embodiment of the present invention proceeds to 317. At 317, the embodiment of the present invention, based on the callers' characteristics and the callers' additional characteristics, plays voice or video advertisements to the caller for a predetermined period.

Figure 4A:
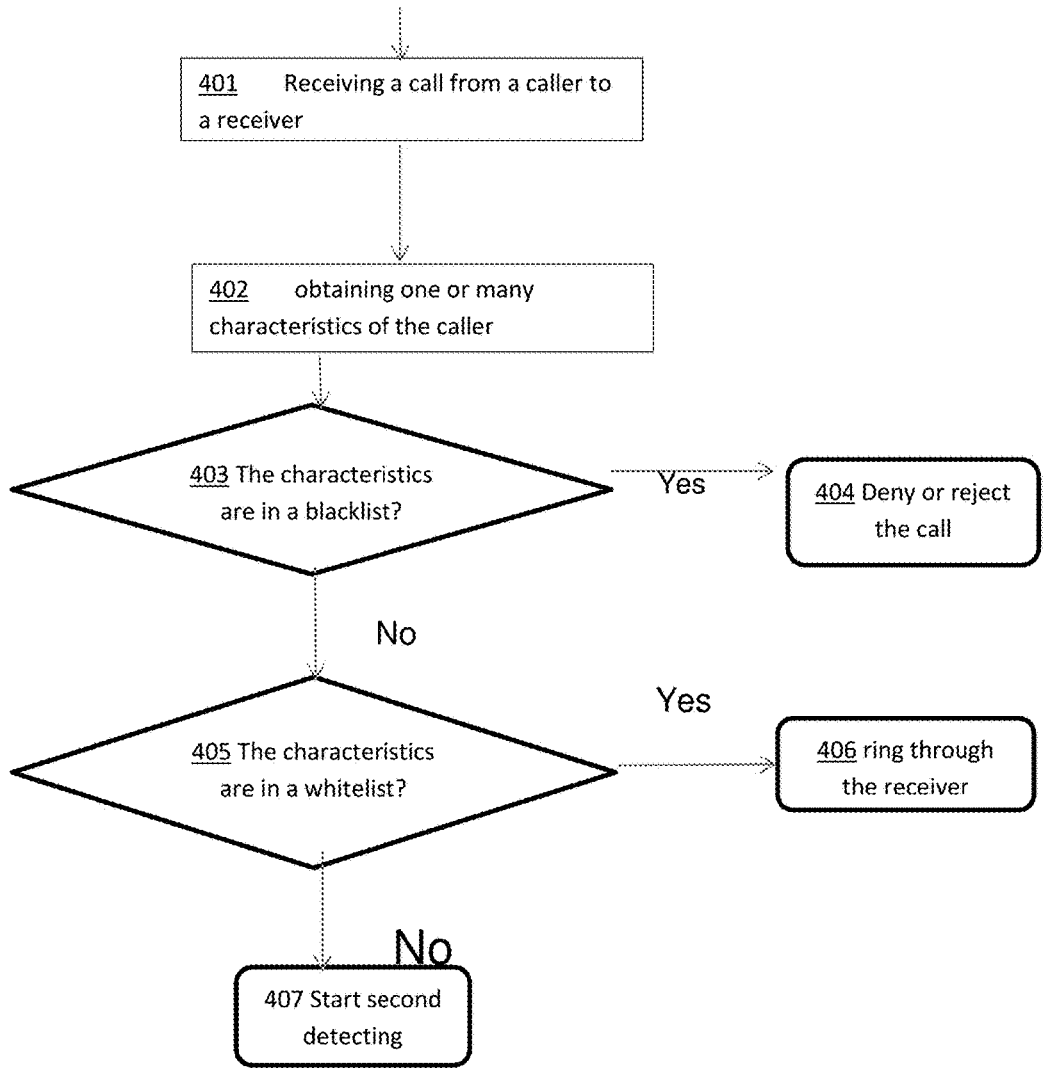
FIG. 4A is a flow diagram illustrating a method of detecting phone frauds or scams in accordance with the third embodiment of the present invention.
Figure 4A:
Figure 4B:
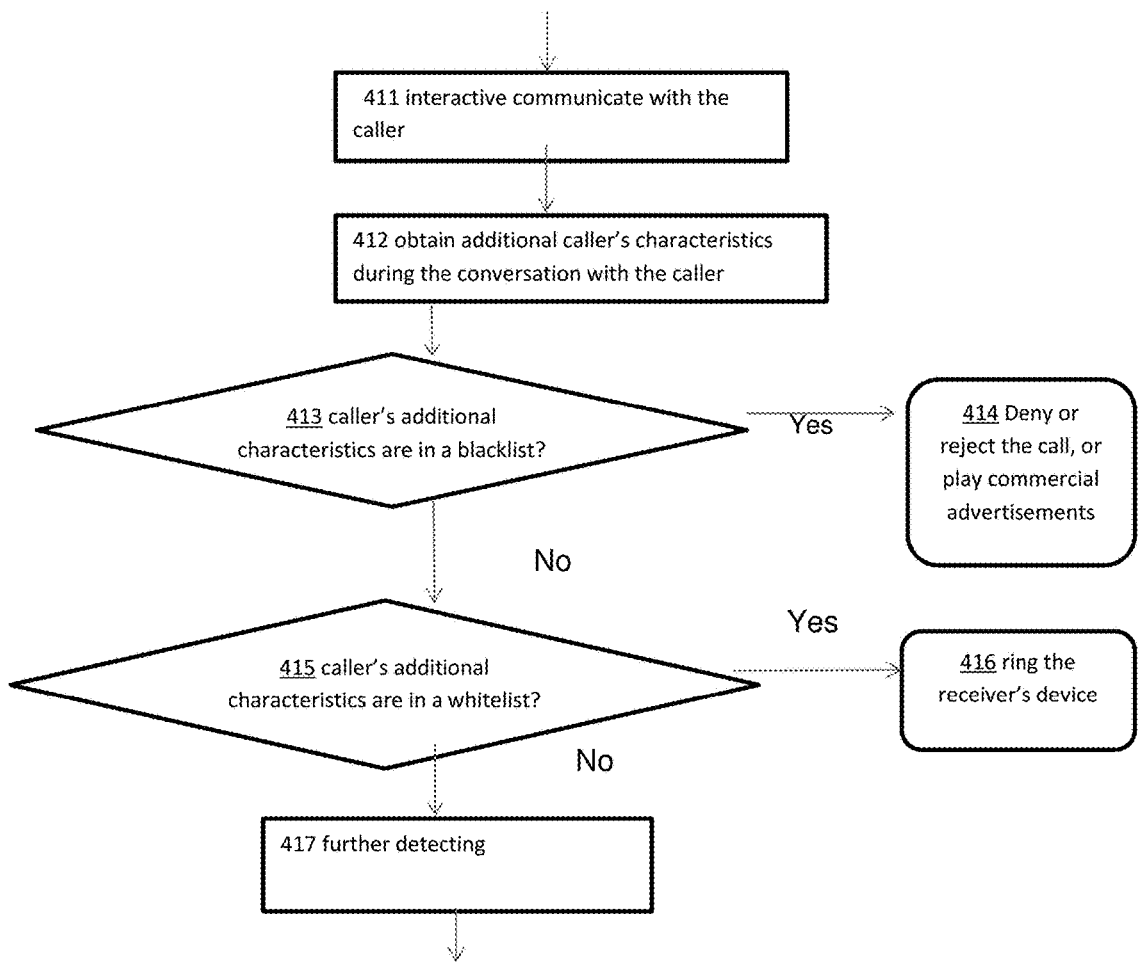
FIG. 4B is a flow diagram illustrating a method of detecting phone frauds or scams in accordance with the fourth embodiment of the present invention.
Figure 4C:
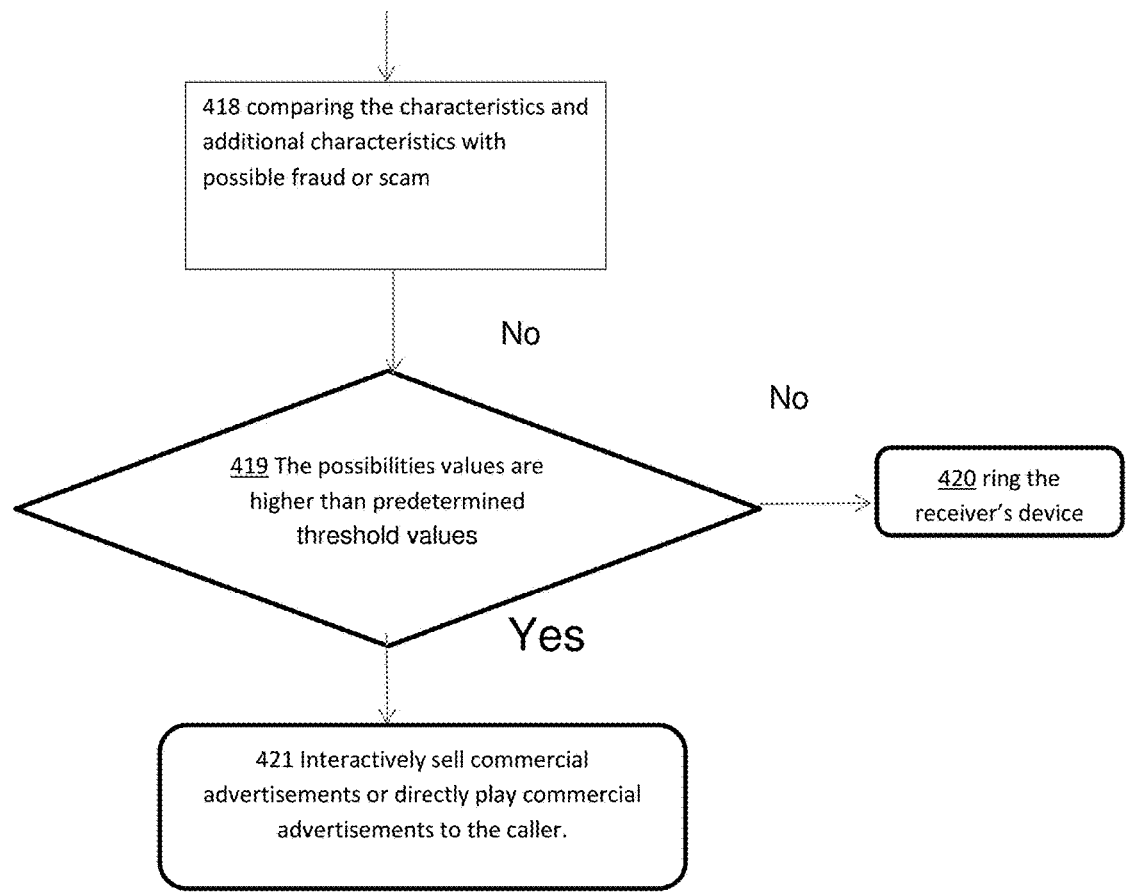
FIG. 4C is a flow diagram illustrating a method of detecting phone frauds or scams in accordance with the fifth embodiment of the present invention.

FIG. 4A, FIG. 4B and FIG. 4C illustrates another method of detecting phone frauds or scams. The method shown in the flow diagram in FIGS. 4A, 4B, and 4C is capable of detecting phone frauds or scams. At 401, the present embodiment receives a call from a caller's device to a receiver's device. The caller's device and the receiver's device are normally mobile phones, regular phones, PCs, or IPads. At 402, the present embodiment obtains the callers' information, which includes one or many characteristics, such as the caller's phone number, IP address, ID, name, location, gender, age, occupation, the caller's contact lists and other data. At 403, the present embodiment determines if the caller's characteristics match with the characteristics in one or many blacklists of known characteristics that are associated with frauds or scams. If one or many the caller's characteristics match the characteristics in the blacklists, then the present embodiment proceeds to 404 to deny or reject the call, otherwise, the present embodiment proceeds to 405. At 405, the present embodiment determines if the caller's characteristics match with the characteristics in one or many whitelists of known characteristics that are not associated with any fraud or scam or any fraud or scam agent, and are trusted by the public and by the receiver. If one or many the caller's characteristics match with the characteristics in the whitelists, then the present embodiment proceeds to 406 to allow the call to ring the receiver's device or to pass the call to the receiver, otherwise, the present embodiment proceeds to 407, which proceeds to 411 to further detecting of frauds or scams.

At 411, the present embodiment of the invention, like Apple's Siri or Google Now, interacts with the caller by asking the caller's one or many questions or responding the caller's questions. At 412, the embodiment obtains or collects additional caller's characteristics during the conversation between or interacting with the caller. At 413, the present embodiment of the invention compares the caller's additional characteristics with the characteristics in one of many blacklists. If one or many caller's additional characteristics match the characteristics in the blacklists, then the embodiment of the present invention proceeds to 414 to deny or reject the call, or play voice or video advertisements to the caller based on the caller's characteristics and the caller's additional characteristics. If the caller's additional characteristics do not match the characteristics in the blacklists, the embodiment of the present invention proceeds to 415. At 415, the embodiment of the present invention compares the caller's additional characteristics with the characteristics of one or many whitelists. If the caller's additional characteristics match the characteristics of the whitelists, the embodiment of the present invention proceeds to 416 to allow the call to ring the receiver's device. If the callers' additional characteristics do not match the characteristics in the whitelists, the embodiment of the present invention proceeds to 417 for further detecting frauds or scams. At 418, the embodiment of the present invention compares the caller's characteristics and the caller's additional characteristics with one or many possible fraud or scam lists. At 419, if the possibility values are higher than predetermined threshold values, the embodiment of the present invention proceeds to 421 to intact with the caller to sell commercial advertisements to the caller, or directly play commercial advertisements to the caller and credit or reward the receiver for playing commercial advertisements to the caller. If the possibility values are lower than predetermined threshold values, the embodiment of the present invention proceeds to 420 to ring the receiver's device.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications and applications is defined in the following claims.

Therefore, the forgoing is considered as illustrative only of the principles of the invention. Furthermore, since numerous modifications and changes will readily occur to those skilled in the art, it is not desired to limit the invention to the exact construction and operation shown and described. Accordingly, all suitable modifications and equivalents may be resorted to, falling within the scope of the invention.

The invention claimed is:

1. A phone frauds or scams detecting system, comprising:
means for receiving a call from a caller's device to a receiver's device;
a detecting unit for interacting with the caller to obtain or collect one or more characteristics of the caller, and determining if the call is a fraud or scam call based on the obtained characteristics;
means for putting the caller on hold and playing voice or video commercial advertisements to the caller if the call is determined as the fraud or the scam call by the determining means;
means for determining one or more types of the commercial advertisements and periods for playing the commercial advertisements based on the caller's characteristics;
a credit or reward unit for crediting or rewarding the receiver for playing the commercial advertisements to the caller;
a configuration unit for allowing the receiver to associate the callers' characteristic to one or more commercial advertisements types or to one or more commercial advertisements;
wherein the said detecting unit further includes a smart assistant unit which comprises:
means for asking the caller questions based on stored strategies or samples for fighting or combating the frauds or the scams;
means for obtaining the caller's characteristics during the interacting with the caller or based on the caller's answering the questions;
means for comparing the characteristics with one or more stored blacklists of known characteristics that are associated with frauds or scams to determine the frauds or the scams;
means for comparing the characteristics with one or more stored whitelists of known characteristics that are trusted by the public or by the receiver.

2. The system of claim 1 further comprising:
voice processing unit for obtaining voiceprints for the caller during the interacting with the caller, and comparing the caller's voiceprint with the voiceprints in a stored database of phone frauds or scams to determine if the call is the fraud call or the scam call, or to determine one or more possibilities values of the phone frauds or the scams for the call;
means for detecting or obtaining a voice accent of the caller during the interacting with the caller.

3. The system of claim 1 further comprising:
means for generating voice menu options for allowing the caller to interact with the system;
means for obtaining one or more caller's characteristics based on the caller's selection of the menu options.

4. A phone frauds or scams detecting system, comprising:
means for receiving a call from a caller's device to a receiver's device;
a detecting unit for obtaining one or more characteristics of the caller and determining one or more frauds or scams possibilities values for the call;
means for putting the caller on hold and playing voice or video commercial advertisements to the caller when the determined frauds or scams possibilities values are higher than one or more predefined values;
means for determining one or more types of the advertisements and periods for playing the advertisements based on the determined frauds or scams possibilities values or the obtained caller's characteristics; wherein said detecting unit further comprises:
means for generating voice menu options for allowing the caller to interact with the system;

means for obtaining the caller's characteristics based on the caller's selections of the menu options;

means for comparing the obtained characteristics with one or more stored blacklists of known characteristics that are associated with frauds or scams to determine if the call is a fraud or scam call;

means for comparing the obtained characteristics with one or more stored whitelists of known characteristics that are trusted by the public or by the receiver;

voice processing unit for obtaining voiceprints for the caller during the interacting with the caller, and comparing the caller's voiceprint with the voiceprints in a stored database of phone frauds or scams to determine if the call is the fraud or the scam call, or to determine the possibilities values of the phone frauds or the scams for the call;

a smart assistant unit for interacting with the caller;

means for asking the caller questions based on stored strategies or samples for fighting or combating the frauds or the scams;

means for obtaining the caller's characteristics during the interacting with the caller or based on the caller's answering the questions;

means for comparing the characteristics with one or more stored blacklists of known characteristics that are associated with frauds or scams to determine the frauds or the scams;

means for comparing the characteristics with one or more stored whitelists of known characteristics that are trusted by the public or by the receiver;

voice processing unit for obtaining voiceprints for the caller during the interacting with the caller, and comparing the caller's voiceprint with the voiceprints in a stored database of phone frauds or scams to determine the phone frauds or scams, or to determine the possibilities of phone frauds or scams;

means for detecting or obtaining a voice accent of the caller during the interacting with the caller;

negotiating or bargaining unit for negotiating or bargaining with the caller, who is trying to sell products to the receiver, to get a better deal on the products for the receiver by using big data or Artificial Intelligence technologies to compare the product's features, prices, or qualities;

a credit or reward unit for crediting or rewarding the receiver for playing the commercial advertisements to the caller;

a configuration unit for allowing the receiver to associate the callers' characteristics to one or more types of commercial advertisements or to one or more commercial advertisements;

a reporting unit for showing the receiver the information about the detected frauds or scams and the credit or reward amount.

5. The system of claim 4 further comprising:
means for playing commercial advertisements of accent reduction courses or accent reduction products if a foreign accent is detected for the caller.

6. The system of claim 4, wherein said detecting unit further comprises
means for comparing the obtained caller's characteristics with one or more possible fraud or scam lists to determine one or many possibilities of frauds or scams for the call.

7. The system of claim 4 further comprising:
a trigger unit for, during the call between the caller and the receiver, allowing the receiver to pass the call to or initiate the detecting unit for determining frauds or scams by touching a screen icon or pressing a button on the receiver's device, shaking the receiver's device, speaking out voice commands, or a special posture by the receiver.

8. A phone frauds or scams detecting system, comprising:
means for receiving a call from a caller's device to a receiver's device;

a detecting unit for interacting with the caller to obtain or collect one or more characteristics of the caller;

means for determining if the call is a fraud or scam call, or determining one or more frauds or scams possibilities values for the call, based on the obtained characteristics;

means for putting the caller on hold and playing voice or video commercial advertisements to the caller when the call is determined as the fraud or scam call, or the determined possibilities values are higher than one or more predefined values;

means for determining one or more types of the advertisements or periods of playing the advertisements based the obtained caller's characteristics or the determined possibilities values of the phone frauds of scams for the call;

wherein said detecting unit further includes a smart assistant unit which comprises:

means for asking the caller one or many questions based on stored strategies or samples for fighting or combating the frauds or the scams;

means for obtaining the caller's characteristics during the interacting with the caller or based on the caller's answering the questions;

means for comparing the obtained the caller's characteristics with one or many stored blacklists of known characteristics that are associated with frauds or scams to determine the possibilities values of frauds or the scams;

means for comparing the obtained characteristics with one or many stored whitelists of known characteristics that are trusted by the public or by the receiver to determine the possibilities values of the frauds or the scams;

a configuration unit for allowing the receiver to associate the caller's characteristics to one or many commercial advertisement types or to one or many commercial advertisements.

9. The phone frauds or scams detecting system of claim 8 further comprising:
means for generating voice menu options for allowing the caller to interact with the system;

means for obtaining the caller's characteristics based on the caller's one or more selections of the menu options;

means for comparing the obtained characteristics with one or more stored blacklists of known characteristics that are associated with frauds or scams to determine if the call is the fraud or the scam call;

means for comparing the obtained characteristics with one or more stored whitelists of known characteristics that are trusted by the public and by the receiver to determine if the call is the fraud or the scam call.

10. The phone frauds or scams detecting system of claim 8 further comprising:
voice processing unit for obtaining voiceprints for the caller during the interacting with the caller, and comparing the caller's voiceprint with the voiceprints in a stored database of phone frauds or scams to determine if the call is the fraud or the scam call, or to determine the possibilities values of the phone frauds or the scams;

means for detecting or obtaining a voice accent of the caller during the interacting with the caller;

means for playing commercial advertisements of accent reduction courses or accent reduction products if a foreign accent is detected for the caller.

11. The phone frauds or scams detecting system of claim 8 further comprising:

voice processing unit for obtaining voiceprints for the caller during the interacting with the caller, and comparing the caller's voiceprint with the voiceprints in a stored database of phone frauds or scams to determine if the call is the phone fraud or scam call, or to determine the possibilities values of phone frauds or scams;

means for detecting or obtaining an accent of the caller during the interacting with the caller;

means for playing commercial advertisements of accent reduction courses or accent reduction products if a foreign accent is detected for the caller.

12. The phone frauds or scams detecting system of claim 8 further comprising:

negotiating or bargaining unit for negotiating or bargaining with the caller, who is trying to sell products to the receiver, to get a better deal on the products for the receiver by using big data or Artificial Intelligence technologies to compare the product's features, prices, or qualities.

13. The phone frauds or scams detecting system of claim 8 further comprising:

a credit or reward unit for crediting or rewarding the receiver for playing the commercial advertisements to the caller.

14. The phone frauds or scams detecting system of claim 8 further comprising:

a reporting unit for showing the receiver the information about the detected frauds or scams and the credit or reward amount.

15. The phone frauds or scams detecting system of claim 8 further comprising:

a trigger unit for, during the call between the caller and the receiver, allowing the receiver to pass the call to or initiate the detecting unit for determining if the call is the fraud or scam call and playing the commercial advertisements to the caller by touching a screen icon or pressing a button on the receiver's device, shaking the receiver's device, speaking out voice commands, or a special posture by the receiver.

* * * * *